DATA-LINK SYSTEM

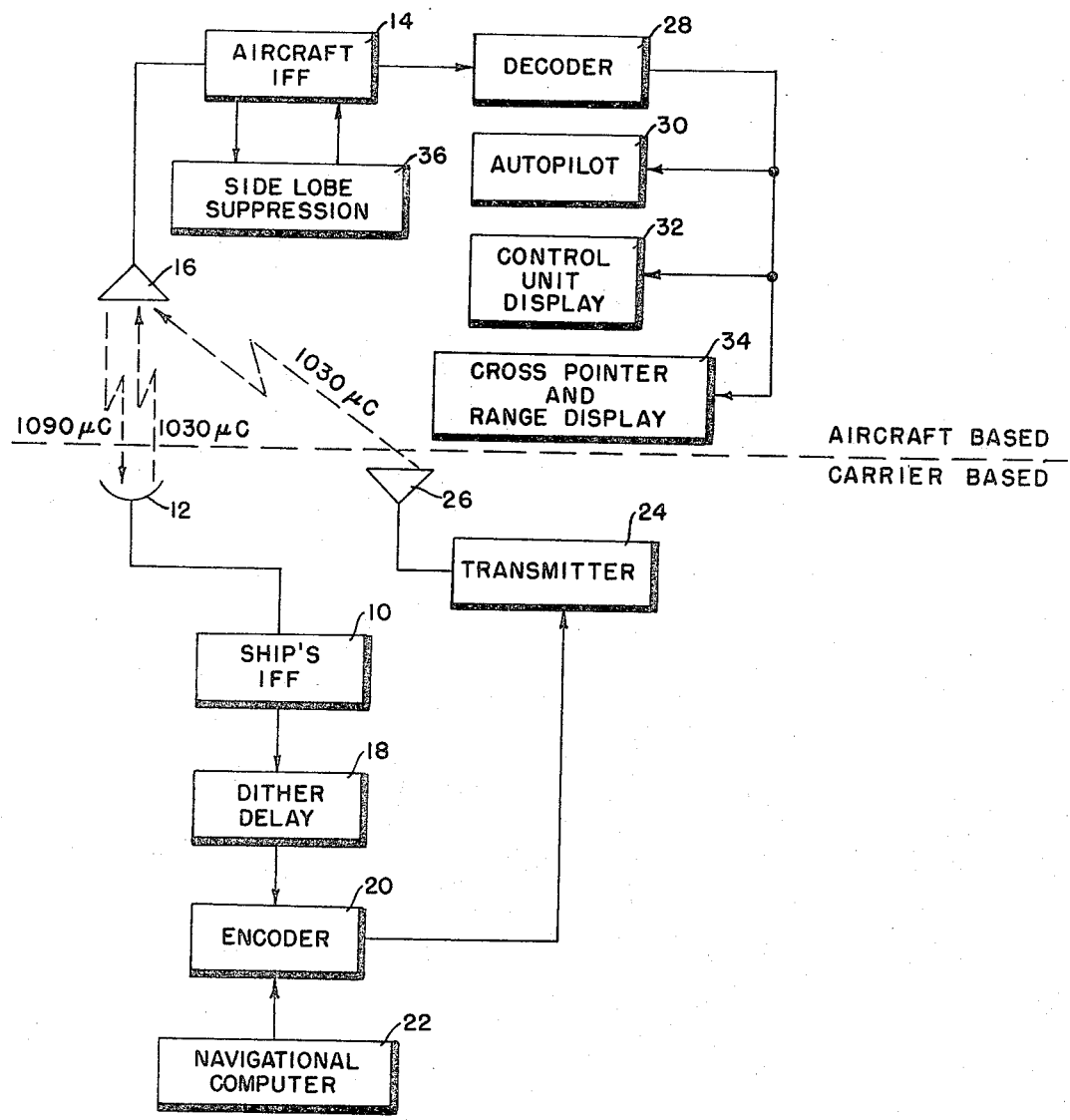

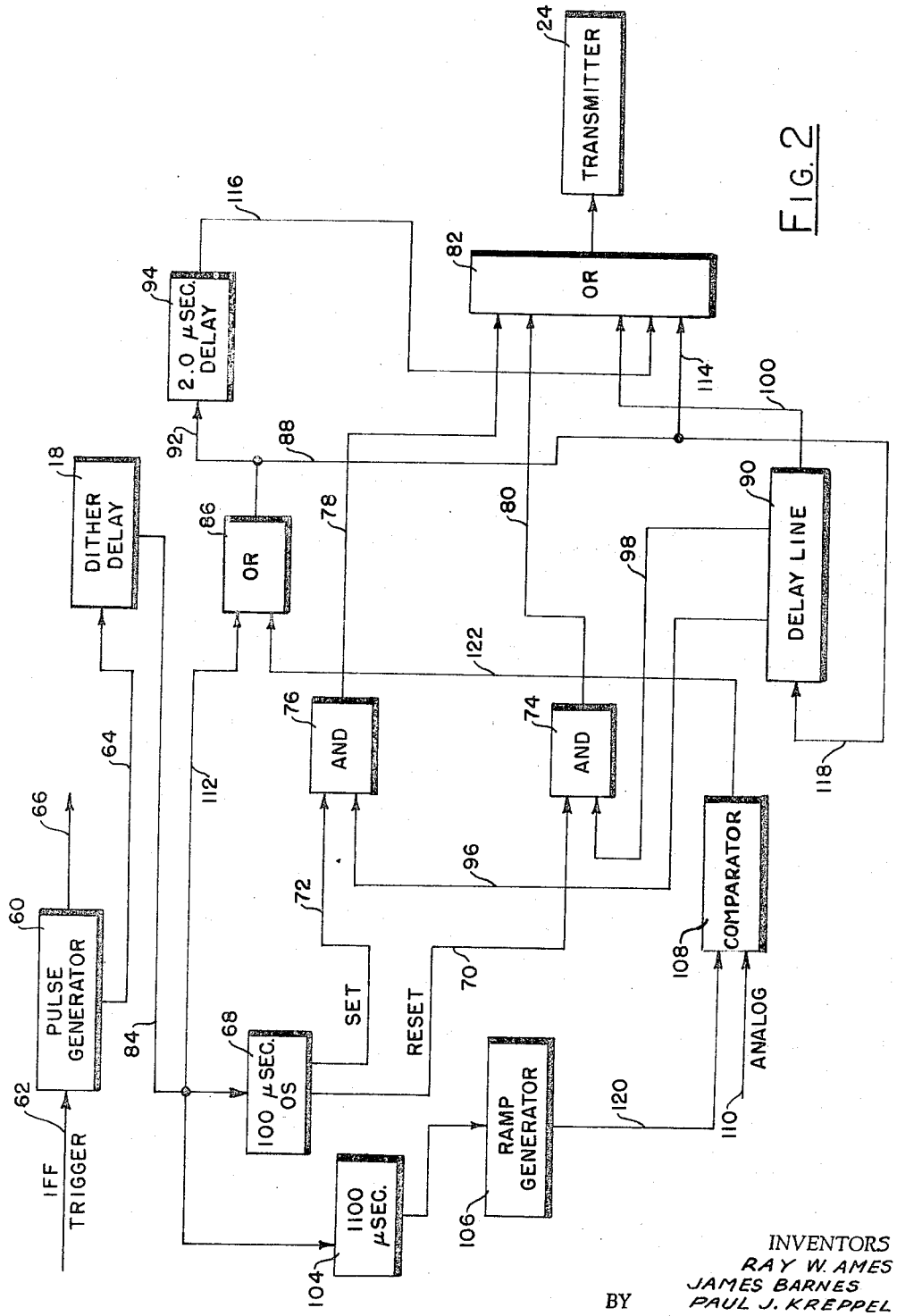

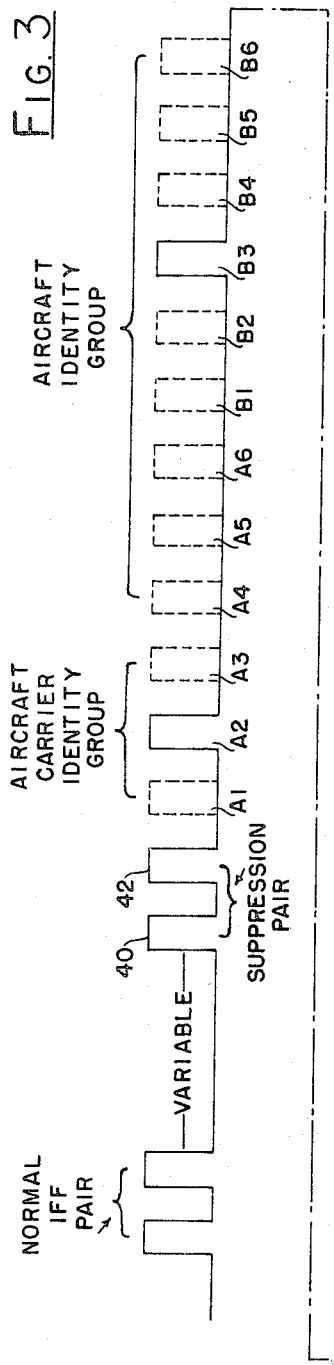
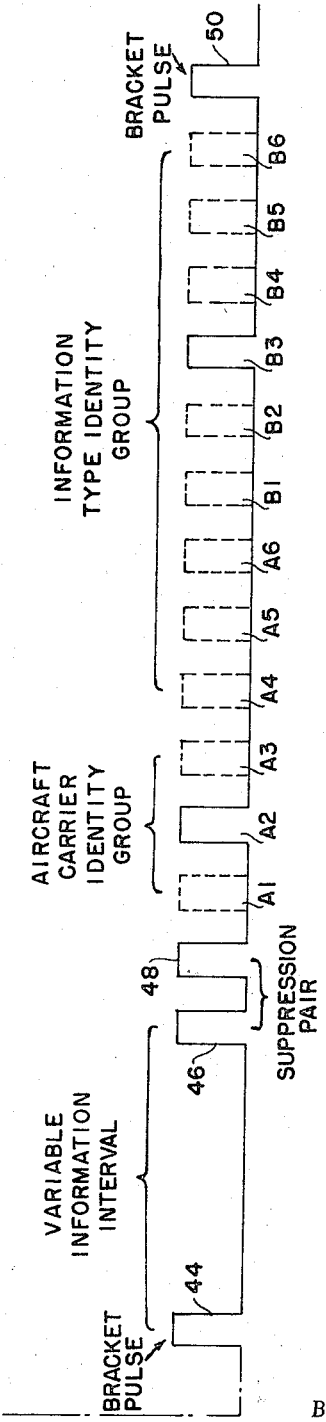
INVENTORS
RAY W. AMES JR.
JAMES BARNES
PAUL J. KREPPEL
BY
Beau, Brooks, Buckley & Beau.
ATTORNEYS June 20, 1967  R. W. AMES, JR., ET AL  3,327,055

Filed Nov. 13, 1963  9 Sheets-Sheet 4

INVENTORS
RAY W. AMES JR.
JAMES BARNES
BY  PAUL J. KREPPEL

Beau, Brooks, Buckley & Beau.
ATTORNEYS

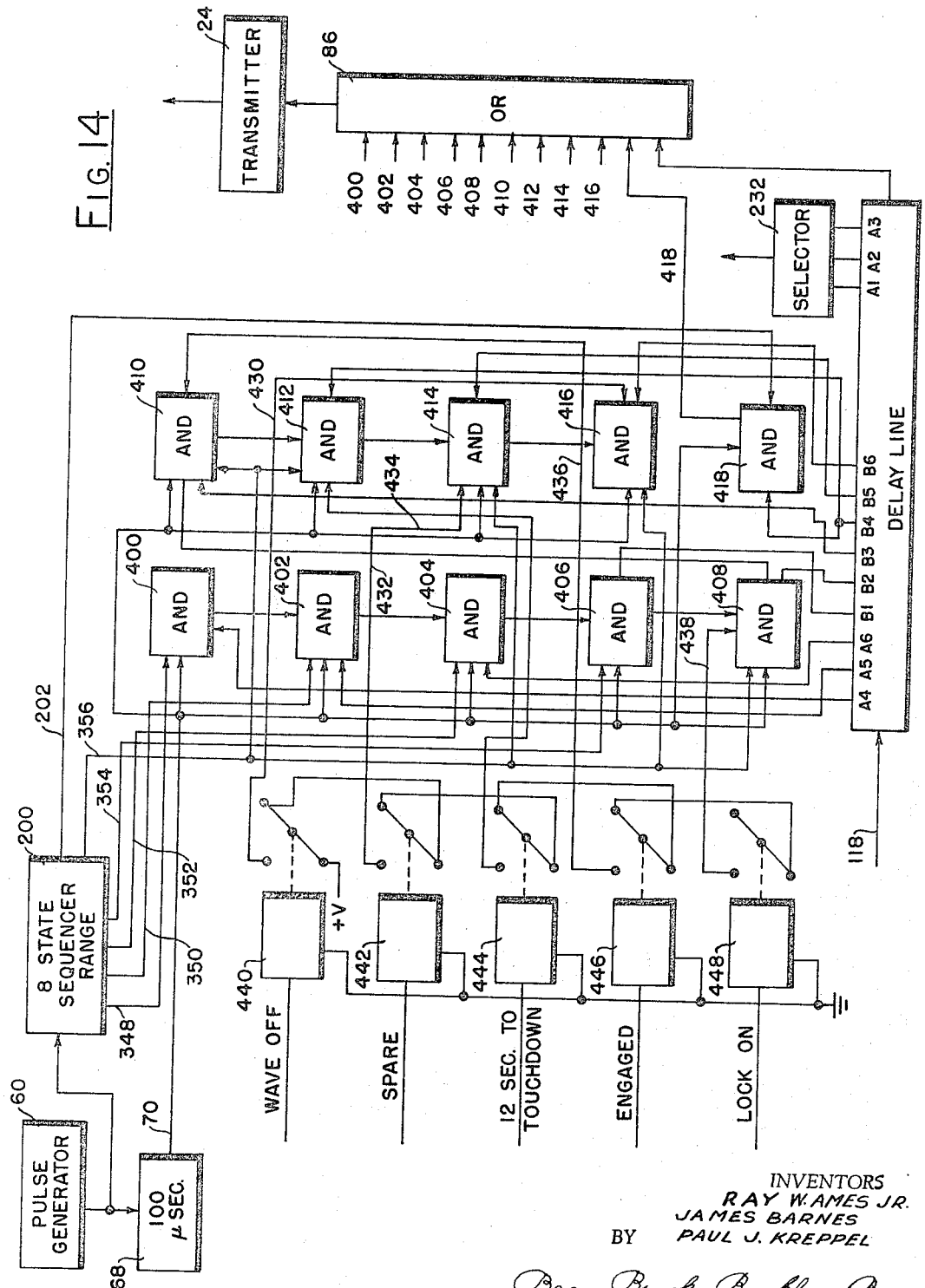

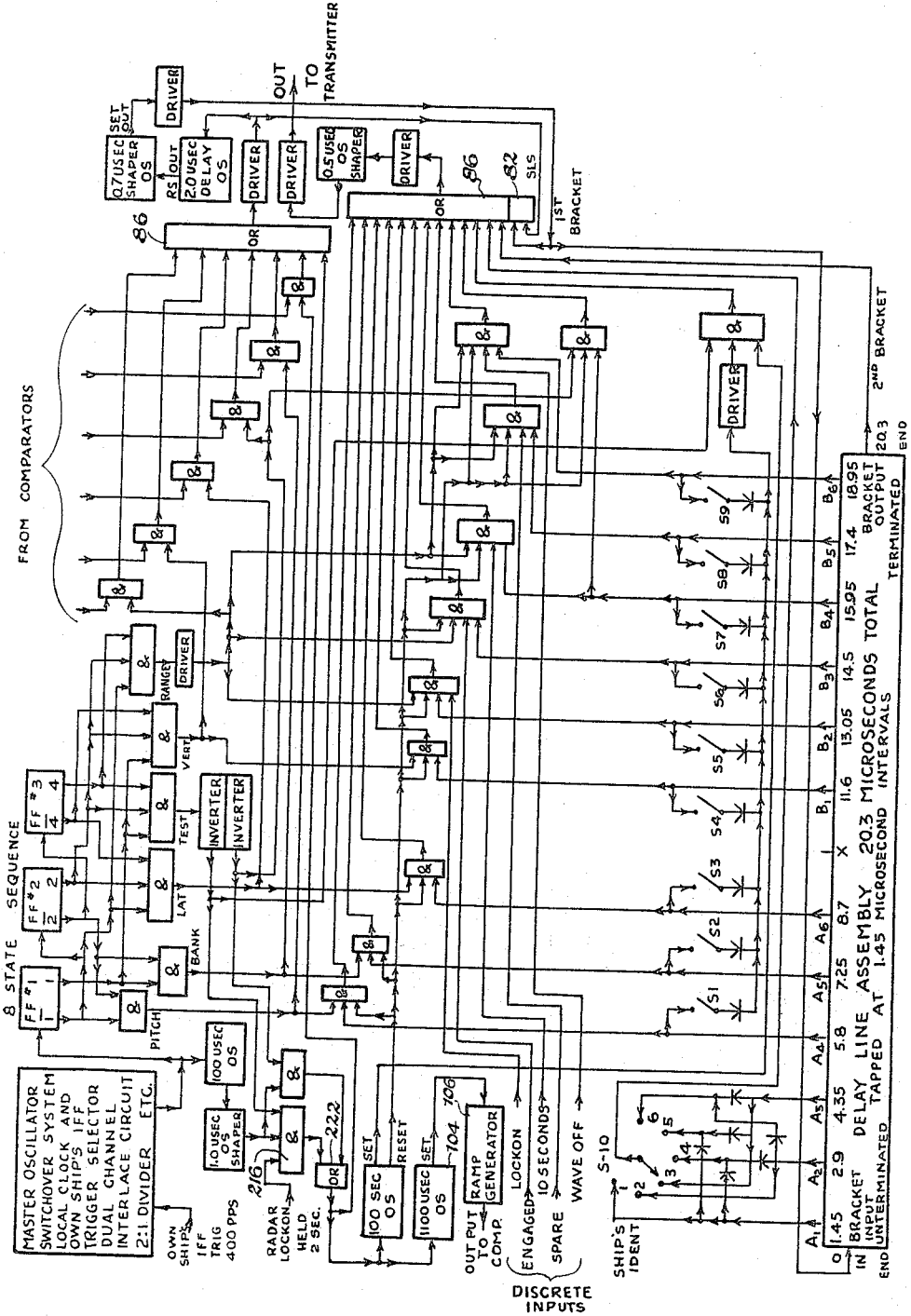

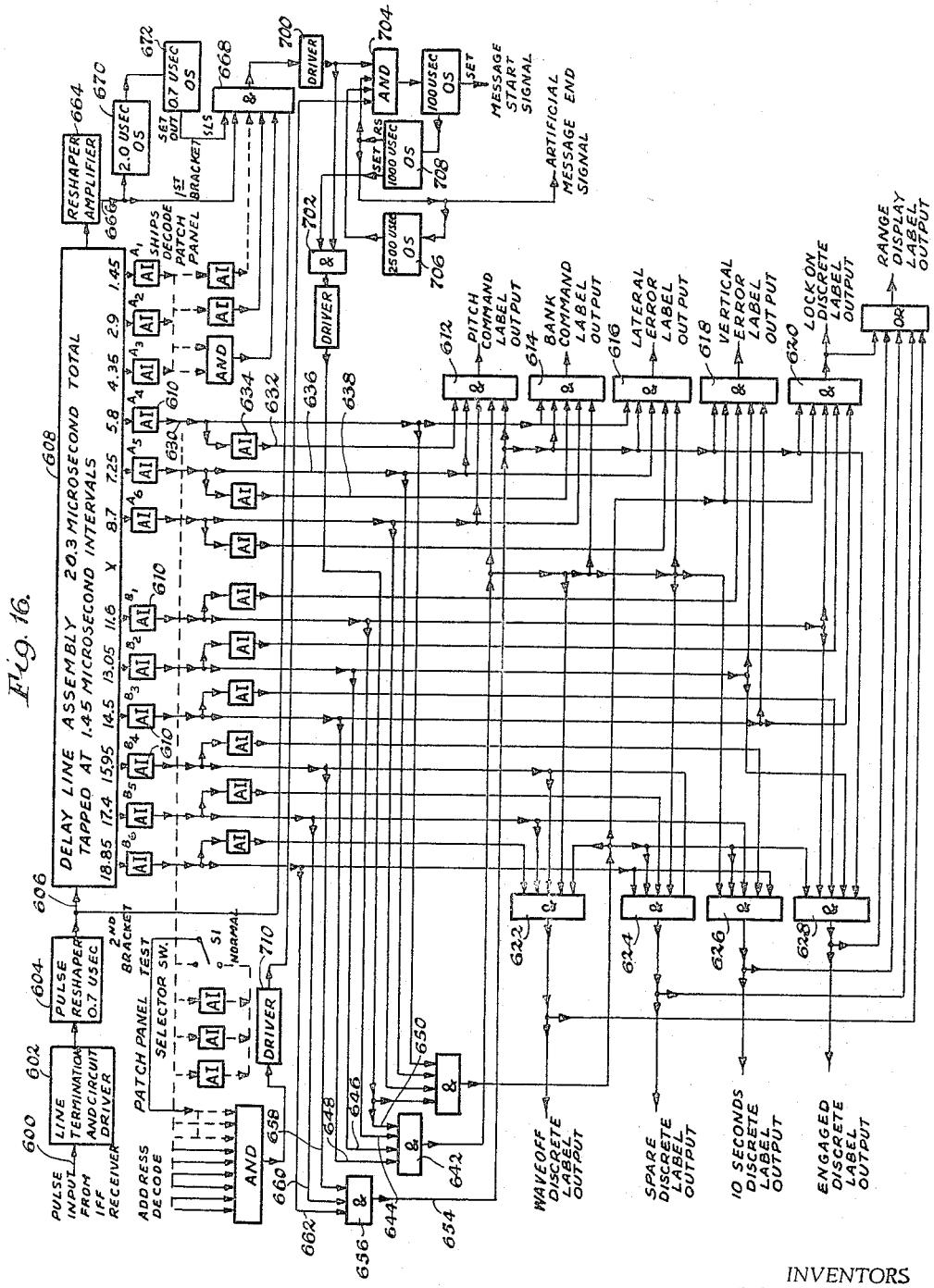

United States Patent Office 3,327,055
Patented June 20, 1967

3,327,055
DATA-LINK SYSTEM
Ray W. Ames, Jr., Tonawanda, James Barnes, Grand Island, and Paul J. Kreppel, Williamsville, N.Y., assignors to Bell Aerospace Corporation
Filed Nov. 13, 1963, Ser. No. 323,443
6 Claims. (Cl. 178—50)

This invention relates to telemetering systems and pertains, in particular, to a system for aiding in the navigation of aircraft.

As disposed in copending application Ser. No. 230,239 filed Oct. 12, 1962, now U.S. Patent No. 3,174,146, a tracking radar located at a ground station and utilizing certain novel computational techniques may be used to transmit command signals to an aircraft which are of such accuracy as to permit completely "hands off" landings even on such a different target area as the deck of an aircraft carrier. The advantages of such a system are believed to be obvious. The present invention relates to a data link system which may be used in association with and as part of the automatic landing system disclosed in the above mentioned copending application.

In one aspect, the present invention relates to an improved data link system of the character described which may be utilized in conjunction with an IFF (Identify Friend or Foe) system in which the data link is adapted to transmit during the dead time of the IFF system and in such fashion as to be completely independent thereof.

In another aspect, the present invention relates to an improved telemetering system of the pulse coded type in which the system is characterized by the transmission of address, information and label pulse groups for the purpose of controlling an aircraft.

A further object of this invention resides in the provision of an improved aircraft control system which may operate in conjunction with and at the same frequency as a conventional IFF system; in which the control system embodies means for temporarily suppressing the airborne transmitter of the IFF system so as to avoid unwanted response from the airborne IFF transmitter during and in response to control system transmission; such means for temporarily suppressing the airborne transmitter also being capable of functioning to suppress IFF response from an aircraft receiving side lobe radiation from the IFF system.

A further object of this invention is to provide an improved data link system wherein initiating pulses of fixed repetitive rate are utilized to initiate a train of pulses, certain of which are passed for transmission, and wherein such initiating pulses also initiate a time-based increasing voltage which is compared with an analog information voltage to cause transmission of a time-based pulse subsequent to transmission of the stated certain pulses; such time-based pulse being effective to initiate another train of pulses, certain of which are passed for transmission; all of such transmitted pulses being effected within the time between consecutive initiating pulses.

Another object of this invention is to provide improved encoder means for the system as set forth. The encoder means includes delay line means for producing the aforesaid train of pulses and is initiated twice during each cycle of operation; once by repetitive pulse generating means and once by the output pulse of comparator means having a time-based output which is a function of an analog information voltage. In addition, the encoder means incorporates a circuitry for preceding each transmitted group of pulses by a pair of pulses having fixed time separation which are cooperable with airborne suppression means to suppress airborne IFF transmitter response during and in response to encoder-induced transmitted pulses. Further, such suppression means may operate independently of the encoder means for operation to suppress IFF response from an aircraft receiving side lobe radiation from an associated IFF system.

Other objects and advantages of the invention will appear from the description hereinbelow and the accompanying drawing wherein:

FIG. 1 is a block diagram illustrating the system according to the present invention and as utilized in association with a conventional IFF system;

FIG. 2 is a functional block diagram of the encoder according to the present invention and illustrating principles of operation thereof;

FIG. 3 illustrates waveforms associated with the present invention;

FIG. 4 illustrates waveforms indicating the manner in which interlace can be effected with the present invention;

Figure 5:
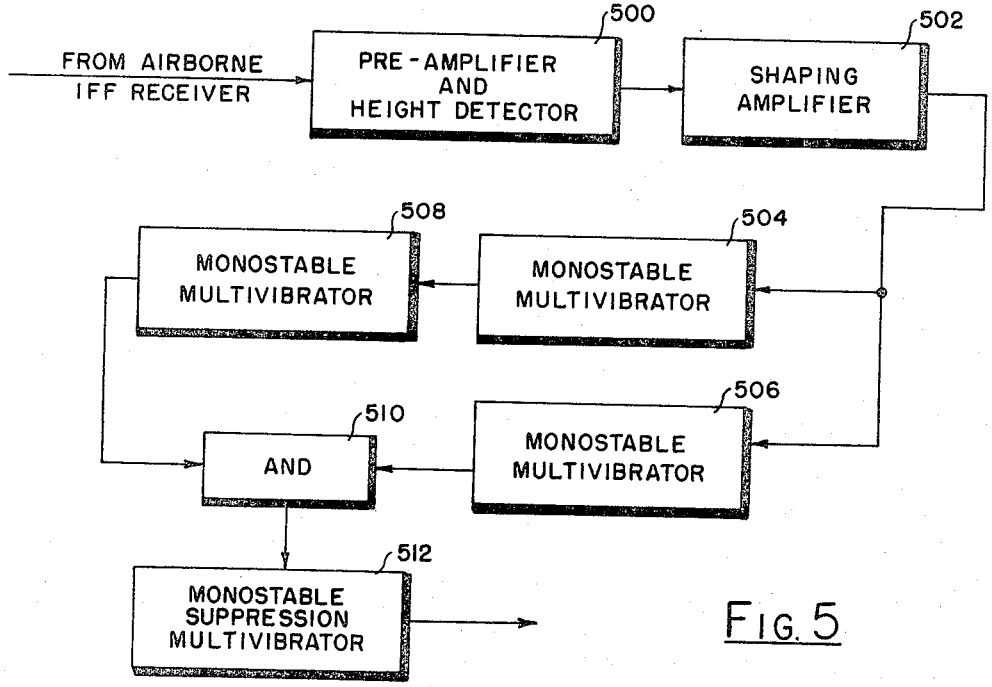
FIG. 5 is a block diagram of the airborne side lobe suppression system.
Figure 6:
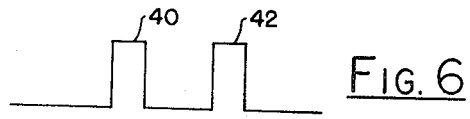
Figure 12:
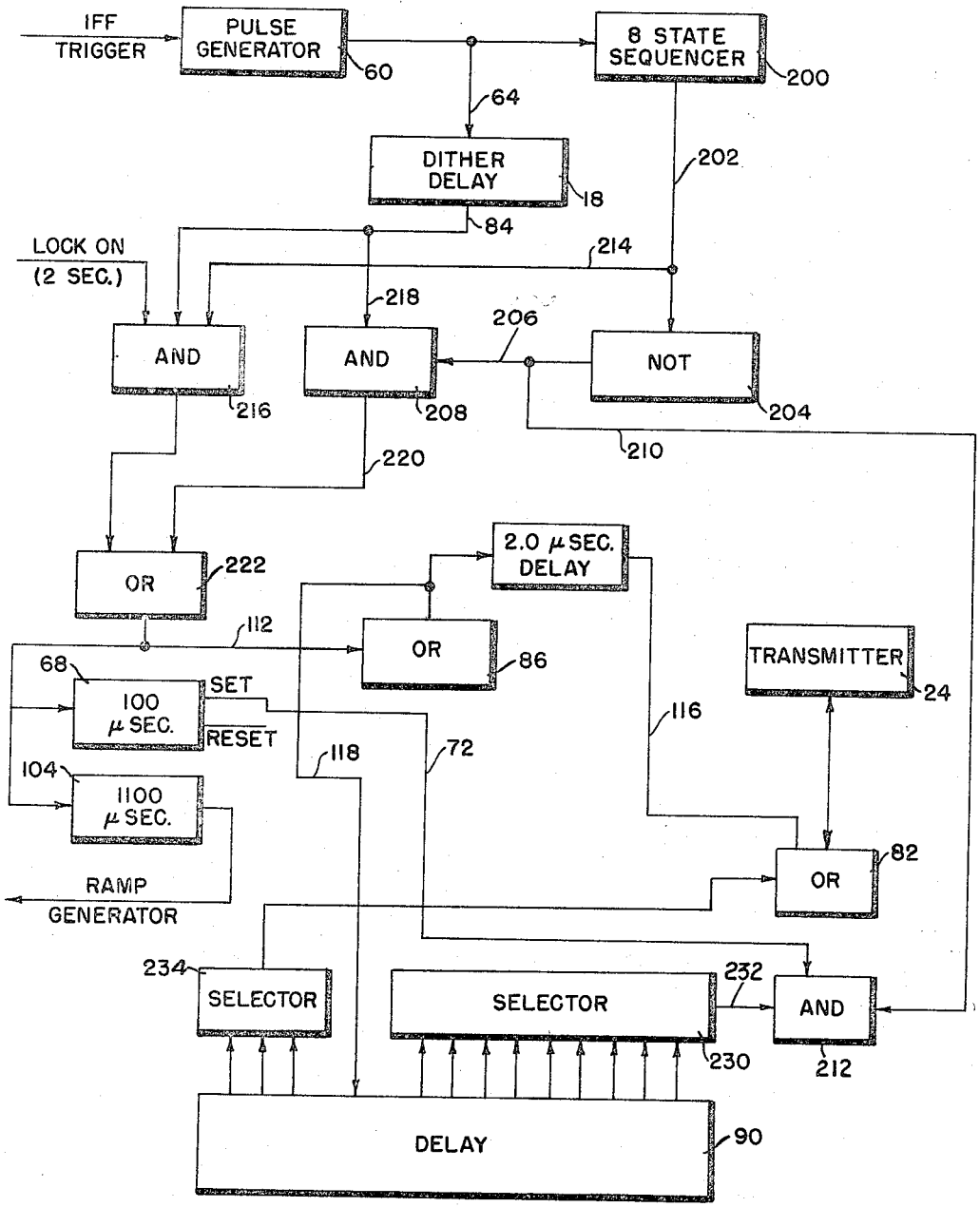
Figure 13:
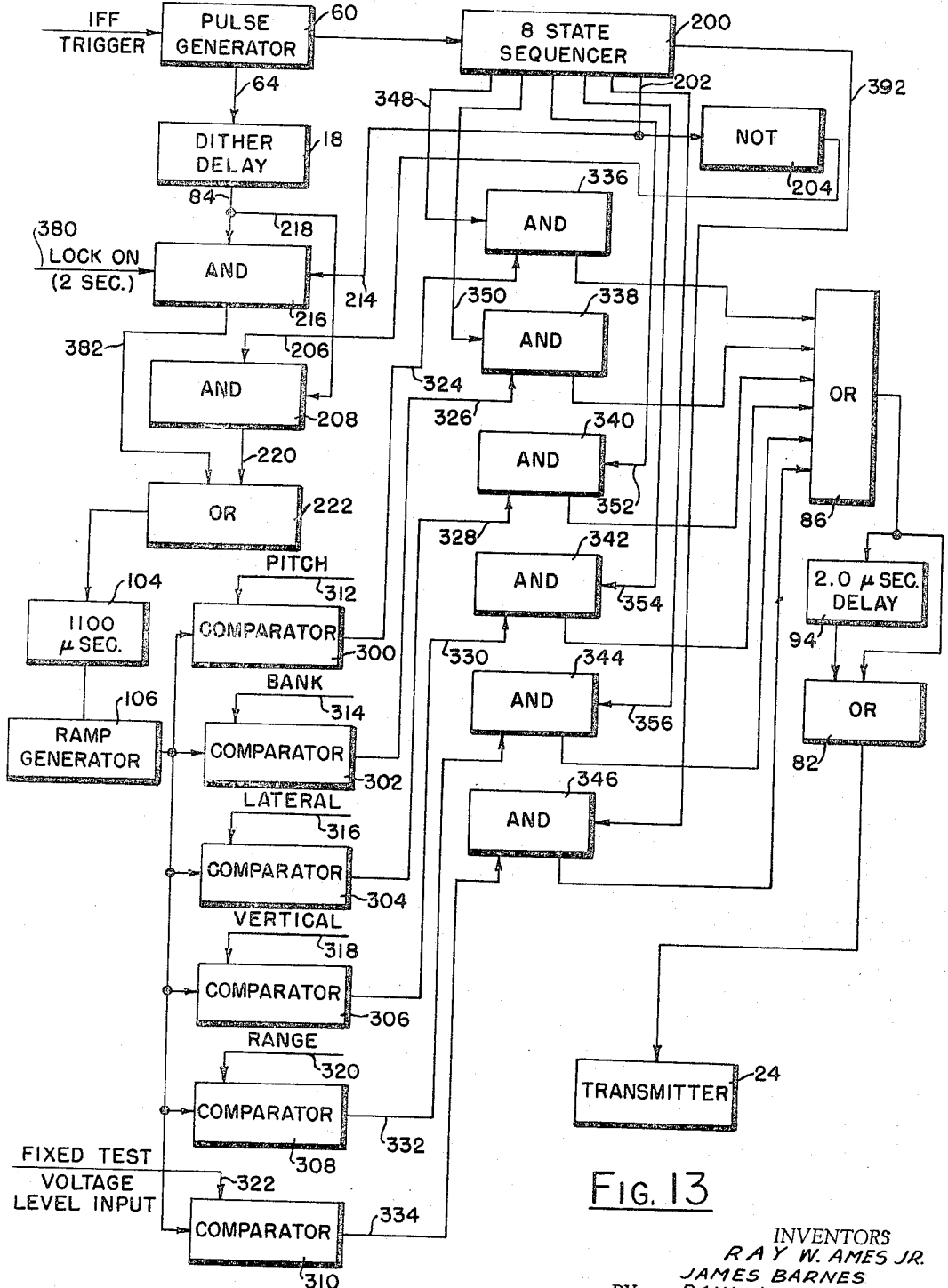

FIGS. 6–11 inclusive are waveforms associated with the circuitry of FIG. 5;

FIG. 12 is a block diagram showing those portions of the encoder means utilized during address group encoding;

FIG. 13 is a block diagram illustrating that portion of the encoding means utilized during information pulse encoding;

FIG. 14 is a block diagram illustrating that portion of the encoding means utilized during label group encoding;

FIG. 15 is a block diagram of the complete encoder system; and

FIG. 16 is a block diagram of the complete decoding system associated with an aircraft.

Referring at this time more particularly to FIG. 1, a preferred system according to the present invention is illustrated therein. In the figure, a system is shown specifically applied in conjunction with an aircraft carrier and reference character 10 indicates a conventional IFF system having a transmitting-receiving antenna 12 which, as diagrammatically illustrated, transmits on a frequency of 1030 megacycles. Airborne equipment is illustrated in the upper portion of FIG. 1 and will be seen to include the conventional airborne IFF system 14 having a transmitting-receiving antenna 16. As is conventional in such IFF systems, the airborne portion 14 of the system is adapted to receive radiation transmitted at the aforesaid frequency of 1030 megacycles and, in response thereto, to transmit at a frequency of 1090 megacycles. As will be understood by those skilled in the art, such relationship properly identifies the aircraft as friendly in accord with entirely conventional techniques.

According to the present invention, the carrier-based IFF system 10 is utilized to trigger, preferably through a dither delay mechanism 18, the encoder 20 according to the present invention. The encoder is provided with certain analog inputs from the computer mechanism 22 and has an output connected to the transmitter 24 controlled to radiate pulse coded information from the antenna 26 thereof. As is illustrated, the transmitter 24 radiates at the same frequency as the IFF system.

The pulse coded information is received by the conventional aircraft IFF system 14, and particularly by the receiver portion thereof, and is relayed to decoding means 28 having an output which is applied to the autopilot 30, the control unit display 32 and to the cross pointer and range display 34.

In addition to the above, the system according to the present invention preferably includes a side lobe suppression device 36 connected to the airborne portion of the IFF system and operating in conjunction therewith to achieve two objectives. First, the side lobe suppression means is cooperable with the encoder 20 to suppress the IFF transmitter of the portion 14 so that no response will be radiated to the ship's IFF system 10 in possible response to the pulse groups transmitted by the antenna 26. Secondly, the side lobe suppression means 36 may operate in conjunction with the conventional IFF system to prevent airborne transmitter response as a result of radiation received by an aircraft in the side lobes of the IFF system. These principles will be expanded upon in further detail hereinafter.

Since conventional IFF systems are operative to produce fixed time spaced pulse pairs occurring at a rate of approximately 400 per second, there is an open time interval of approximately 2500 microseconds between the successive pulse pair transmissions thereof. In the preferred embodiment of the invention as is illustrated in FIG. 1, data transmission from the antenna 26 is made in this open interval so as not to interfere with the normal IFF function. Furthermore, it is preferred that the delay time between the normal or conventional IFF pulse pair and the start of the data transmission is made to dither between 50 and 200 microseconds in order to minimize interference from another station operating at the same 400 p.r.f. rate. It is for this purpose that the dither delay mechanism 18 as shown in FIG. 1 is utilized. Any conventional circuitry for effecting such a dither delay may be utilized.

With reference at this time to FIG. 3, representative data transmission shown in association with a normal IFF pair of pulses is illustrated. In this figure, three pulse slots A1, A2 and A3 are shown as comprising an aircraft carrier identity group, a pulse only in correspondence with the slot A2 being representatively shown and which would identify a particular aircraft carrier. Next, there are a group of slots A4, A5, A6, B1, B2, B3, B4, B5 and B6 in which any one or a combination thereof may be used to identify a particular aircraft. For representative purposes, only the pulse corresponding to the slot B3 is shown as present. The aforesaid pulses corresponding to the twelve pulse slots are preceded by a pulse pair as indicated by the reference characters 40 and 42 and these pulses are utilized for the purpose both of bracketing the pulses of the address group slots and for effecting suppression of the airborne IFF transmitter for an interval at least as great as the time taken for the entire first group of pulses. The address pulse group is also terminated by a bracket pulse 44 and it is to be understood that regardless of the particular combination or combinations of pulses occurring within the slots A1–A6 and B1–B6, both the suppression pair of pulses 40 and 42 as well as the bracket pulse 44 are always present.

The next pulse of interest in the data transmission is the pulse 46 which occurs within the information interval as shown and the time location of which is a function of an analog input voltage from a navigational computer 22 (FIG. 1) as more particularly set forth hereinafter. The pulse 46, then, constitutes an information pulse. At the same time, as will hereinafter appear, the information pulse 46 causes the transmission of a second pulse 48 in which the pulse 46 together with the pulse 48 constitute a suppression pair comparable to the suppression pair 40 and 42 for suppressing airborne transmitter response during the interval in which the second group of pulses is being transmitted. This second group of pulses, or the label group, includes the pulse slots A1–A6 and B1–B6. The slots A1–A3 constitute the aircraft carrier identity group which is identical to the previously mentioned aircraft carrier identity group. That is to say, the aircraft carrier identity is transmitted during both the address group and the label group and, for this reason, a pulse corresponding to the slot A2 is shown as present in each case. The slots A4–A6 and B1–B6 of the label group, on the other hand, are utilized to identify the type of information represented by the pulse 46 aforementioned, and, as before, the label group of pulses is terminated by a bracket pulse 50 substantially as is shown.

FIG. 4 illustrates the capability of the present system, as hereinafter described, for providing two-channel interlace transmission. Thus, between the first two normal IFF pulse pairs 52 and 54, the address, information and label pulses 56 of one channel are transmitted whereas it will be seen that between the next adjacent pulse pairs 54 and 58, there is open time within which another channel may operate, the channel pulses 56 occurring then after the pulse pair 58.

The spacing between conventional or normal IFF pulse pairs may be fixed at 3, 5, 8, 17 or 25 microseconds, according to conventional practice. According to a preferred embodiment of the invention, all pulses of the data system herein are of 0.7 microsecond width and the spacing between the suppression pairs 40, 42 and 46, 48 is 2.0 microseconds. Furthermore, the total time, leading edge to leading edge, between the pulses 42 and 44 and the pulses 48 and 50 is 20.3 microseconds whereas the spacing between the pulses of the A1–A6 is 1.45 microseconds and a similar spacing is used between the pulses of the group B1–B6. Moreover, control of the information pulse 46 is such that it cannot occur within the interval of the address group of pulses whereas the total time between the pulses 40 and 50 will fall between 168.6 and 936.6 microseconds, dependent upon the particular time location of the information pulse 46 as controlled by the analog function to which it corresponds.

The encoder 20 of FIG. 1 is shown diagrammatically in FIG. 2. In this latter figure, pulse generating and divider means 60 is shown as having an input 62 from the ship's IFF system 10. As has been stated hereinbefore, conventional IFF operation provides pulse pairs at a p.r.f. rate of 400 and the mechanism 60 is adapted to generate pulses of 400 p.r.f. but having interlace outputs at 64 and 66, each of which is at a rate of 200 p.r.f. The channel corresponding to the output 66 may be connected to an encoder similar to that shown specifically in FIG. 2 for dual channel capability.

The output 64 of the pulse generator and divider 60 is applied, through the aforementioned dither delay 18 to a control means 68. The control means 68 has a stable state output 70 and a quasi-stable output 72 and upon the reception of a pulse from the generator 60, the control means 68 is actuated from its stable to its quasi-stable state. Thus, the control means 68 may conventionally take the form of a monostable multivibrator having a quasi-stable state time duration of 100 microseconds or thereabouts but which is, in any case, greater than the time interval of the address group described in conjunction with FIG. 3. This stable and quasi-stable state outputs 70 and 72 are connected to AND gate means 74 and 76 respectively and which AND gate means have outputs 78 and 80 ultimately applied to the transmitter 24, preferably through an OR gate means 82.

The output 84 of the dither delay means 18 is, in addition to its connection to the control means 68, connected, preferably through the OR gate means 86, to a conductor 88 leading to a delay line means 90 and also, through conductor 92, to a 2.0 microsecond delay means 94. The delay line means 90 has a plurality of output taps corresponding to the pulse slots A1–A6 and B1–B6. Certain selected of these taps are connected through the conductor 96 to the aforementioned AND gate means 76 and these selected pulses constitute the address group of pulses. Similarly, a selected group of the outlet taps of the delay line means 90 is connected through the conductor 98 to the AND gate means 74. Further, the delay line has a terminal tap connected to the conductor 100 leading to the OR gate means 82 for transmission of the bracket pulse 44 or 50, as the case may be.

The output 84 of the dither delay 18 is also connected to comparator means including the monostable multivibrator 104, the ramp generator 106, and the comparator 108 having an analog input 110 thereto. Thus, referring back to FIG. 3, the normal IFF pairs as shown therein trigger the pulse generator 60 and, dependent upon the instantaneous delay caused by the dither delay means 18, the first pulse 40 is effected through the conductor 112, the OR gate means 86, the conductor 88 and the conductor 114 through the OR gate means 82 to transmitter 24. At the same time, the second pulse 42 is produced by the 2.0 microsecond delay means 94 connected, through conductor 116, to the OR gate means 82 substantially as is shown. Thus, the pulse generator 60 initiates the suppression pair 40 and 42. At the same time, the input 118 to the delay line means 90 is energized and the address group of pulses corresponding to slots B2 and B4 of FIG. 3 are transmitted through the conductor 96 to the AND gate means 76. At the same time, the pulse through the dither delay has actuated the monostable multivibrator 68 to its quasi-stable state so that the output signal through the conductor 72 is applied to the AND gate means 76. Thus, the address group of pulses will be passed by the AND gate means 76 and ultimately applied for transmission by the transmitter 24.

In the meantime, the pulse generator 60 has also initiated operation of the 1100 microsecond monostable multivibrator which triggers the ramp generator 106 having an output 120 to the comparator means 108. As soon as the voltage at the output 120 reaches the level of the amplitude of the analog input 110 thereto, a pulse will be transmitted through the conductor 122 through the OR gate means 86, the conductor 88, the conductor 114, the OR gate means 82 to the transmitter 24 to transmit the pulse 46 shown in FIG. 3. The pulse 48 is also initiated but appears with 2.0 microsecond delay because of the delay means 94. The analog input 110 to the comparator means 108 is obtained from the navigational computing means of the aforesaid copending application and since this is an analog voltage input, it will be seen that the time position of the pulse 46 is a function of the magnitude of such analog voltage.

It will also be appreciated that the generation of the pulse 46 also initiates the delay line means 90 to once again obtain a train of pulses certain of which, as applied to the AND gate means 74 through the conductor 98, are permitted to pass such AND gate means and through the output 80 thereof to the transmitter 24 since the control means 68 has in the meantime returned to its stable state so that the signal appears at its output 70. The label group of pulses as applied to the AND gate means 74 contains the same aircraft carrier identity group pulse relationship as was present in the address group whereas the information type identity group comprising the slots A4–A6 and B1–B6 corresponds to the particular type of analog input 110 to the comparator means 108. Obviously, if different kinds of analog information are to be transmitted, there will be several comparators 108 required and suitable switching means to correspondingly alter the identity within the slots A4–A6 and B1–B6 of the label group. Such relationship will be pointed out more in detail hereinafter.

With reference at this time more particularly to FIG. 12, that portion of the encoding means 20 of FIG. 1 which is utilized during transmission of the address group of pulses shown at the left-hand side of FIG. 3 is illustrated. In addition to those circuits discussed specifically in association with FIG. 2, the encoding means includes an eight state sequencer 200 having six outputs, two of which are used twice during each sequence; however, during transmission of the address group, only one output of the sequencer, the test output 202, need be considered and thus only this output is shown in FIG. 12. The test output 202 is shown as connected to a NOT circuit 204 having an output through the conductor 206 to an AND gate 208. The output of the NOT circuit 204 is also connected through conductor 210 to the AND gate 212. For purposes of clarification, the test output at 202 is also shown as directly connected through the conductor 214 to the AND gate 216 but it is to be understood that the AND gate 216 has no function in association with the address group of signals.

Since the AND gate 208 is also provided with an input at 218 from the output of the dither delay means 18, it will be appreciated that when the test output 202 is not producing a signal, a signal will be produced at the conductor 206 so that the AND gate 208 will pass the pulse from the dither delay means 18, through the conductor 220 to the OR gate 222. The output of this OR gate 222 is through the conductor 112 mentioned in conjunction with FIG. 2 which is applied to the OR gate 86 to ultimately produce the pulses 40 and 42 of FIG. 3. At the same time, the control means 68 is energized to its quasi-stable state and the signal is applied therefrom through the conductor 72 to the aforementioned AND gate 212. Thus, whenever the test output 202 of the eight state sequencer 200 has no signal thereon, the AND gate 212 will pass whatever aircraft identification is indicated by the delay line output taps A4–A6 and B1–B6. For this purpose, a selector switch 230 is used to select the proper signals. In the case shown specifically in FIG. 3, only that tap connected to the B–3 delay line output would be passed to the AND gate 212 through the conductor 232. Prior to this time, the proper aircraft carrier identity signal as achieved by the selector switch 234 connected to the A1–A3 taps of the delay line means 90 has been passed through the selector 234 to the OR gate 82 for transmission. Thus, it will be seen that whenever a signal is not present at the test output 202 of the eight state sequencer 200, the aircraft carrier identity groups will be transmitted. On the other hand, when a signal appears at the output 202, only the aircraft identity group preceded by the suppression pulse pair will be passed since, under these circumstances, a signal does not appear at the conductor 210 so as to block passage of the aircraft identity group through the AND gate 212. The operation of the system during test will be described more particularly hereinafter since this relates to the information pulse portion of the cycle.

With reference now to FIG. 13 wherein that portion of the encoder means to be used during the information pulse interval is shown, it will be seen that the 1100 microsecond monostable multivibrator 104 is actuated by signals passed through the OR gate 222 and that the output of this monostable multivibrator 104 is applied to the six comparators 300, 302, 304, 306, 308 and 310 through the ramp generator 106 previously mentioned. Thus, beginning with the pulse 40 of FIG. 3, the ramp generator will produce a time-based increasing voltage for the 1100 microsecond interval controlled by the multivibrator 104. The comparators have analog voltage inputs 312, 314, 316, 318 and 320 corresponding to the pitch, bank, lateral error, vertical error and range analog outputs of the navigational computer 22 shown in FIG. 1 and which is constructed in accordance with the aforesaid copending application. In addition, a fixed test voltage is applied through the conductor 322 to the comparator 310, the purpose of which will be presently apparent. The outputs of the respective comparators are applied through conductors 324, 326, 328, 330, 332 and 334 to the respective AND gates 336, 338, 340, 342, 344 and 346. Furthermore, each of these AND gates has an output connected to the aforementioned OR gate 86. The eight state sequencer 200 is connected to the pulse generating means 60 so as to step this sequencer. The particular construction of the sequencer 200 is such that the pitch output 348 thereof is activated to produce a signal at the first and fifth steps, the bank output 350 thereof is stepped to produce an output at the second and sixth steps, the lateral output 352 is stepped to produce an output at the third step, the vertical error output 354 is energized to produce a signal at the fourth step, the range output 356 thereof is activated to produce an output signal at the seventh step thereof and the aforementioned test output 202 is stepped to produce a signal at the eighth step. As can be seen, these outputs of the sequencer 200 are applied to the respective AND gates 336, etc.

Thus, assuming that the sequencer has an output only at the pitch output conductor 348, only the signal passed through the AND gate 336 from the comparator 300 will be transmitted and, moreover, the time position of the appearance of such pulse will be a measure of the analog input at the pitch conductor 312 from the navigational computer 22. Therefore, since the OR gate 86 is connected directly to the OR gate 82 and indirectly thereto through the delay means 94, the pulses 46 and 48 which comprise the suppression pair as well as the information pulse 46, will appear in response to the aforesaid operation of the AND gate 336.

When, however, there is a signal at the test output 202 of the eight state sequencer 200, no signal will appear at the conductor 206 so that the AND gate 208 is blocked. The AND gate 216, on the other hand, is supplied with an input signal through the conductor 214 and if the lock-on signal, held for two seconds, appears from the navigational computer 22, there will also be an input at the conductor 380 to the AND gate 216 so that when the pulse appears through the dither delay means 18, the output through the conductor 382 of the AND gate 216 will energize the time-based voltage generating means. At the same time, the signal at the output 202 of the eight state sequencer is applied through conductor 392 to the AND gate 346 so that the fixed test voltage signal pulse may be passed therethrough and transmitted. Thus, the test pulse will be transmitted once every sequence cycle of the sequencer 200 providing a signal that appears at the lock-on input 380 to the AND gate 216. At the same time, referring to FIG. 12, it will be remembered that when the test output 202 is energized, no aircraft identity pulses of the address group are transmitted, but only the aircraft carrier identity is transmitted. The lock-on signal appears only for a two second period immediately after radar lock-on and, during this time, the repetitive appearance of the fixed-value test pulse will permit the airborne receiver to be calibrated by suitable means (not shown) so that subsequent pitch, bank, etc. information may be accurately decoded.

Referring now more particularly to FIG. 14 wherein that portion of the encoder means which is used during the label group is shown, it will be seen that the same includes a plurality of AND gates, 400, 402, 404, 406, 408, 410, 412, 414 and 416. Of these, the AND gates 400, 402, 404 and 406 have inputs from the sequencer 200 as indicated whereas the gates 408, 410, 412, 414 and 416 have inputs from the range output conductor 356 of the sequencer 200. Additionally, a further AND gate 418 is provided which is connected to the output 202 of the sequencer 200 previously described. In addition, each of the AND gates 400–418 has an input from the stable state output 70 of the control means 68 previously described. Further, the respective AND gates 400, 402, 404, 406, 408, 410, 412, 414 and 416 are connected to the respective pulse slot outlets A4, A5, A6 and B1–B6, inclusive, of the delay line means 90. The outputs of the AND gate means 400–416 are connected to the OR gate 86 although for the purpose of clarity, the connections are not completed in FIG. 14. Thus, depending upon the state of the sequencer 200, the various AND gates will or will not pass signals therethrough for transmission by the transmitter 24. The delay line means outputs for the slots A4, A5, A6 and B1 correspond to pitch, bank, lateral error and vertical error respectively and are connected to respective AND gates 400, 402, 404 and 406. The B2, B3, B4, B5 and B6 slots are reserved for lock on, engaged, twelve seconds to touchdown, a spare and waveoff respectively; these latter being connected to the respective AND gates 408, 410, 412, 414 and 416. In addition, these latter AND gates are connected to the conductors 430, 432, 434, 436 and 438 controlled by the discrete signal relays 440, 442, 444, 446 and 448 respectively; each of such relays being engaged individually at such times as these discrete signals are to be transmitted.

Figure 7:
Figure 8:
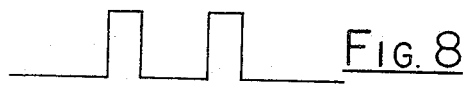
Figure 9:
Figure 10:
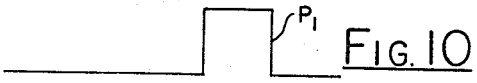
Figure 11:
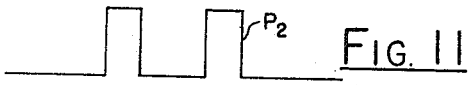

Referring now more particularly to FIG. 5, the side lobe suppression means 36 is shown in detail therein. As shown, a preamplifier and height detector 500 is connected to the IFF receiver and upon receipt of the side lobe suppression pair 40 and 42, produces an output having two peaks as indicated in FIG. 7; both peaks occurring by reason of the fact that the two pulses 40 and 42 are of the same or substantially the same height. It will be understood that the second peak would not appear if the second pulse were of considerably less amplitude than the pulse 40, the purpose of this relationship being apparent hereinafter. However, assuming for the moment that both peaks appear, the output of FIG. 7 is passed through the shaping amplifier 502 wherein the side lobe suppression pair pulses are reproduced, as is shown in FIG. 8. The output of the shaping amplifier is applied to the two monostable multivibrators 504 and 506, the former of which produces a pulse output as illustrated in FIG. 9 and this output is applied to the monostable multivibrator 508 whose pulse output, in response to the output signal of FIG. 9 is as shown in FIG. 10. In the meantime, the monostable multivibrator 506 has produced an output in accord with FIG. 11. The output of FIG. 10 (multivibrator 508) and FIG. 11 (multivibrator 506) are both applied to the AND gate 510 which will produce an output, since the pulses P1 and P2 of FIGS. 10 and 11 are in coincidence, activating the suppression multivibrator 512. The output of the suppression multivibrator 512 is applied to the airborne transmitter of the IFF system for suppression thereof for a period of about 45 microseconds (that is, for a period at least as great as the duration of the address or label group). In this way, due to the presence of the suppression pair 40, 42, no response of the airborne IFF transmitter can be elicited by any pulse pairs which might occur during the address group. Similarly, due to the presence of the pulse pair 46, 48, no response may occur during the label group.

Additionally, the airborne side lobe suppression system may be utilized independently of the data link system to produce side lobe suppression in conjunction with normal IFF operation. For this purpose, the system requires a ground station from which two pulses, two microseconds apart, are transmitted from different antennas such that, in general terms, side lobes have the second pulse equal to or higher than the first; and main lobes have the first pulse at least 9 decibels higher than the second. As a result, because of the system of FIG. 5, the aircraft transponder will respond only to main lobe interrogation. That is to say, referring to FIG. 6, if the pulse 40 is not at least 9 decibels higher than the pulse 42, the second peak of FIG. 7, and consequently the second pulse of FIG. 8 will not appear. Thus, there can be no coincidence as in FIGS. 10 and 11 and the airborne transponder may respond in the normal fashion. In the side lobes, the condition of FIGS. 10 and 11 will occur, and transponder response is suppressed. Under this condition, the preamplifier and height detector 500 will not produce an output according to FIG. 7, but only one peak will occur therein so that the output of the shaping amplifier 502 is but a single pulse, the first shown in FIG. 8. As a consequence, there will be no pulse P2 present in FIG. 11 and no suppression will occur.

The airborne decoder is shown in FIG. 16, it being appreciated that the circuitry shown is merely a preferred embodiment of the decoder. To appreciate the operation of this device, the response to the signals shown in full lines in FIG. 3 will be considered. The decoder receives the pulse input from the airborne IFF receiver at 600 and the signals are applied to the line termination and circuit driver assembly 602 prior to application to the pulse reshaper 604. The output of the pulse reshaper 604 is applied, at 606, to the delay line assembly 608 which is provided with output taps corresponding with the output taps of the delay line 90 of the encoder. Each of the output taps A1–A6 and B1–B6 is connected to a NOT circuit such as those designated by reference characters 610. The outputs from these NOT circuits control the various AND gates 612, 614, 616, 618, 620, 622, 624, 626 and 628 which provide label outputs as identified in FIG. 16 corresponding to the particular analog information type identity group of FIG. 3 were to contain pulse corresponding to the A4 tap (rather than tap B3 as shown) the AND gate 612 would pass a pulse to indicate that the pulse 46 (FIG. 3) was a pitch command signal. Specifically, for the AND gate 612 under these circumstances, the following simultaneous conditions would prevail:

(1) The NOT circuit 610 of the A4 tap would produce no signal at its output 630 due to the A4 tap signal so that a signal would appear at the output 632 of the associated NOT circuit 634.

(2) A signal would be present at the output 636 to AND gate 612 indicating no signal at output tap A5.

(3) A signal would be present at the output 638 to AND gate 612 indicating no signal at output tap A6.

(4) A signal would be present at the output 640 of AND gate 642 to AND gate 612 indicating no signal at B1, B2 or B3 (signals at inputs 644, 646 and 648 to AND gate 642) and the presence of a signal (at AND gate 642 input 650) from the driver 652.

(5) A signal would be present at the output 654 of AND gate 656 to AND gate 612 indicating no signal at B4, B5 or B6 (signals at inputs 658, 660 and 662 to AND gate 656).

To appreciate the function of the device 652, it will be realized that the input to the delay line 608 is also applied to the reshaper amplifier 664 whose output at 666 is split to provide two inputs for the AND gate 668; one which extends directly thereto and the other of which is applied after a 2.0 microsecond delay. The latter signal is obtained by means of the monostable multivibrator 670 having a pulse width of 2.0 microseconds. The trailing edge of the pulse from the multivibrator 670 triggers the multivibrator 672 whose output is applied to the AND gate 668.

The output of the AND gate 668 is connected, through the driver 700, to AND gates 702 and 704. Other inputs to the AND gate 704 are from the 2500 microsecond monostable multivibrator 706, the 1000 microsecond monostable multivibrator 708, and the driver 710. The two multivibrators 706 and 708 apply actuating signals to the AND gate 704 during their stable states and the multivibrator 708 applies an actuating signal to the AND gate 702 during its quasi-stable state.

From the preceding description, it will be apparent that a combined data link-IFF system is provided in which data is transmitted during the dead time between IFF pulse pairs and at the same frequency as the IFF transmission. The data link system is triggered by the IFF system for proper disposition of the data link information within the dead time of the IFF system. Essentially, the data link includes a means for producing a series of pulses in response to a pulse input thereto; there being first and second pulse output means for actuation of such means for producing a series of pulses. The first pulse output means includes the IFF system as part thereof whereas the second pulse output means is actuated by the first pulse output means and includes the mechanism for providing the analog voltage information. In this way, a highly efficient and effective composite system is provided.

Additionally, the present invention employs suppression means to prevent IFF response to data transmission, which suppression means may also be utilized to advantage to prevent IFF response when the aircraft IFF system is receiving side lobe IFF energy.

It is to be understood that certain changes and modifications as illustrated and described may be made without departing from the spirit of the invention or the scope of the following claims.

We claim:

1. In a pulse transmitting device, in combination,
a transmitter,
delay line means having address-coded output tap means and label-coded output tap means,
first and second AND gate means having input connections from said address-coded output tap means and said label-coded output tap means respectively, said first and second AND gate means being connected to said transmitter to energize the same,
pulse generating means for energizing said delay line means,
control means connected to the output of said pulse generating means for actuation thereby from a stable state to a quasi-stable state in which the quasi-stable state is of greater duration than the delay time of said delay line means and having its quasi-stable state output connected to said first AND gate means for passing said address-coded output when the control means is in its quasi-stable state and its stable state output connected to said second AND gate means for passing said label-coded output when the control means is in its stable state,
ramp generating means connected to and actuated by said pulse generating means for producing a time-based increasing voltage output,
comparator means connected to the output of said ramp generating means and having analog voltage information input means for producing a pulse output in response to amplitude equality of said ramp generating means output and said analog voltage input means,
the pulse output of said comparator means being connected to said transmitter and to said delay line means, and means for delaying the energization of said transmitter and said delay line means by said comparator means until said control means has returned to its stable state.

2. In a data link system, in combination,
means for generating a sequence of pulses,
delay means connected to the pulse generating means for producing a train of pulses in response to each pulse received from the pulse generating means, in which the total period of said train of pulses is much less than the period between successive pulses of said sequence of pulses,
voltage generating means connected to said pulse generating means and actuated thereby to produce a time-based increasing voltage output in response to each pulse of the sequence,
coincidence circuit means connected to said voltage generating means and having an analog voltage input thereto for producing an analog indicative pulse when the analog input is of amplitude equality with the output of said voltage generating means,
first gate means connected to the pulse train outputs of said delay means and to said pulse generating means for control by the latter to pass selected pulses of said train,
second gate means connected to the pulse train output of said delay means and inhibited by said pulse generating means during operation of said first gate means to pass certain pulses of said train,
the output of said coincidence circuit means being connected to said delay means to control said second gate means to pass said certain pulses whenever an output is present from said coincidence circuit means and said first gate means is not operative to pass said selected pulses.

3. A data link transmitter comprising, in combination,
pulse generator means for generating time-spaced pulses,
pulse output means connected to the output of said pulse generator means for producing a series of pulses in response to each of said time-spaced pulses in which the time duration of each such series of pulses is substantially less than the time interval between said time-spaced pulses, a transmitter, switch means connecting the output of said pulse output means to said transmitter for passing a selected pattern of said series of pulses to said transmitter for transmission thereby, ramp generator means connected to the output of said pulse generator means and actuated by each of said time-spaced pulses to provide a voltage output increasing with time, a plurality of analog information devices, each having an analog voltage output, comparator means having the output of said ramp generator means as one input thereto and the analog voltage outputs of said analog devices as other inputs thereto, said comparator means having an analog information pulse output corresponding to each of said other inputs, stepping means for selectively connecting individual ones of the analog information pulse outputs of said comparator means to said transmitter through said pulse output means for transmission of said individual analog information pulse and a selected pattern of said series of pulses which may be different from the first mentioned selected pattern of said series of pulses.

4. A data link transmitter comprising, in combination, pulser means for producing a series of pulses in response to a single pulse input thereto, first pulse output means having a first output pulse connected to said pulser means to produce a first series of pulses, second pulse output means having a second output pulse connected to said pulser means to produce a second series of pulses, said second pulse output means including a time-based increasing voltage generator connected to and actuated by said first pulse output means, information signal means having an analog voltage output, and comparator means having the outputs of said time-based increasing voltage generator and said information signal means as inputs thereto for producing said second output pulse which is time-delayed with respect to said first output pulse in proportion to the instantaneous value of said analog voltage output, a transmitter, and switch means connecting said pulser means to said transmitter, said switch means being controlled by the output of said first pulse output means to pass a coded pattern of selected ones of said first series of pulses, and said switch means being controlled by said second pulse output means to pass the time-delayed output pulse thereof and a coded pattern of selected ones of said second series of pulses.

5. In a data link system, in combination, transmitter means for repetitively transmitting a coded train of pulses including a bracket pulse in the last bit position of the train and an information pulse delayed from said bracket pulse by a period of time indicative of the information content of said information pulse, pulse generator means for producing a sequence of pulses, delay means for exciting said transmitter means to produce said coded train of pulses in response to each pulse of said sequence of pulses, voltage generating means for producing a time-based increasing voltage output in response to each pulse from said pulse generator means and commencing subsequent to the occurrence of said bracket pulse, and comparator means having the output of said voltage generator means and an analog information voltage as inputs thereto for exciting said transmitter means to produce said information pulse in response to amplitude-equality of such inputs.

6. In a data link system, in combination, pulse generator means for producing a sequence of pulses, means for transmitting a first coded group of pulses followed by a second coded group of pulses in response to each pulse of said sequence, in which each coded group has a bracket pulse in the first and last bit positions of the group, said means for transmitting including delay means responsive to each pulse of said sequence for producing said first coded group of pulses, comparator means having a pulse output subsequent to the occurrence of said last bit bracket pulse of said first coded group for energizing said delay means to produce said second coded group of pulses, said comparator means having a variable voltage analog information input and including time-based increasing voltage generator means responsive to each pulse of said sequence having an output to which said analog information input is compared to produce said pulse output of the comparator means, whereby the time spacing between said last bit position of the first coded group and said first bit position of said second coded group is variable and in proportion to the analog value of said information input.

References Cited
UNITED STATES PATENTS

| | | | |
|---|---|---|---|
| 2,966,675 | 12/1960 | Smoll | 343—6.5 |
| 2,973,507 | 2/1961 | Grondin | 178—2 X |
| 3,026,375 | 3/1962 | Graham | 179—15 |
| 3,058,104 | 10/1962 | Garfinkel et al. | 343—6.5 |
| 3,073,904 | 1/1963 | Davis | 179—15 |
| 3,164,827 | 1/1965 | Preikschat | 343—6.5 |

JOHN W. CALDWELL, *Acting Primary Examiner.*

CURTIS L. JUSTUS, *Examiner.*

E. T. CHUNG, W. S. FROMMER, *Assistant Examiners.*